(12) United States Patent
Kawakami et al.

(10) Patent No.: US 9,964,161 B2
(45) Date of Patent: May 8, 2018

(54) CONTROL SYSTEM FOR MESHING TYPE ENGAGEMENT MECHANISM

(71) Applicant: TOYOTA JIDOSHA KABUSHIKI KAISHA, Toyota-shi (JP)

(72) Inventors: Takaho Kawakami, Susono (JP); Motoki Tabuchi, Mishima (JP); Hirotsugu Yoshino, Susono (JP); Fusahiro Tsukano, Susono (JP); Isamu Shiotsu, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 194 days.

(21) Appl. No.: 14/994,486

(22) Filed: Jan. 13, 2016

(65) Prior Publication Data

US 2016/0201737 A1 Jul. 14, 2016

(30) Foreign Application Priority Data

Jan. 13, 2015 (JP) .................................. 2015-003949

(51) Int. Cl.
*F16D 25/061* (2006.01)
*F16D 48/02* (2006.01)
(Continued)

(52) U.S. Cl.
CPC ........... *F16D 25/061* (2013.01); *F16D 25/14* (2013.01); *F16D 48/00* (2013.01); *F16D 48/02* (2013.01);
(Continued)

(58) Field of Classification Search
CPC ........ F16D 11/14; F16D 25/061; F16D 25/14; F16D 48/02; F16D 2048/0233;
(Continued)

(56) References Cited

U.S. PATENT DOCUMENTS 2,428,336 A 9/1947 Munschauer
2,803,149 A * 8/1957 Pringle ................... F16H 48/08
192/85.18

(Continued)

FOREIGN PATENT DOCUMENTS

JP 63-145828 A 6/1988
JP 1-500923 A 3/1989
(Continued)

*Primary Examiner* — Richard M Lorence
(74) *Attorney, Agent, or Firm* — Oblon, McClelland, Maier & Neustadt, L.L.P.

(57) ABSTRACT

A control system for a meshing type engagement mechanism includes a meshing type engagement mechanism and an electronic control unit. The electronic control unit is configured to allow a fluid chamber to be filled with a fluid by putting a switching valve into a cut-off state after respective dog teeth mesh with each other by a second member reaching a predetermined position determined in advance in response to a fluid pressure of the fluid chamber such that the second member is pressed in the direction in which the second member is separated from a first member by a release force depending on the torque transmitted between a surface of a first tooth and a surface of a second tooth, the fluid pressure of the fluid chamber is increased, and an engagement state between the first member and the second member is maintained by the fluid pressure which is increased.

6 Claims, 6 Drawing Sheets

(51) Int. Cl.
*F16D 48/06* (2006.01)
*F16D 48/00* (2006.01)

(52) U.S. Cl.
CPC .... *F16D 48/066* (2013.01); *F16D 2048/0245* (2013.01); *F16D 2048/0266* (2013.01); *F16D 2500/10462* (2013.01); *F16D 2500/50607* (2013.01)

(58) Field of Classification Search
CPC ..... F16D 2048/0245; F16D 2048/0266; F16D 48/06; F16D 48/066; F16D 2500/10462; F16D 2500/50607; F16D 2500/50615
See application file for complete search history.

(56) References Cited

U.S. PATENT DOCUMENTS

| | | | | |
|---|---|---|---|---|
| 5,035,310 | A | * | 7/1991 | Meyerle .................. B60T 1/005 192/108 |
| 6,131,686 | A | * | 10/2000 | Scotti ...................... B60K 17/34 180/245 |
| 2003/0089573 | A1 | | 5/2003 | Ackermann |
| 2009/0062044 | A1 | | 3/2009 | Shioiri et al. |
| 2011/0021314 | A1 | | 1/2011 | Keeney et al. |
| 2015/0362027 | A1 | | 12/2015 | Ebuchi et al. |

FOREIGN PATENT DOCUMENTS

| | | |
|---|---|---|
| JP | 2006-300270 | 11/2006 |
| JP | 2012-224290 A | 11/2012 |
| JP | 2013-92211 | 5/2013 |
| WO | WO 88/00661 | 1/1988 |
| WO | WO 2014/115248 A1 | 7/2014 |

\* cited by examiner

CONTROL SYSTEM FOR MESHING TYPE ENGAGEMENT MECHANISM

INCORPORATION BY REFERENCE

The disclosure of Japanese Patent Application No. 2015-003949 filed on Jan. 13, 2015 including the specification, drawings and abstract is incorporated herein by reference in its entirety.

BACKGROUND OF THE INVENTION

1. Field of the Invention

The invention relates to a control system for a meshing type engagement mechanism that is configured to transmit a torque from an input member to an output member by engaging dog teeth with each other and, more particularly, to a control system that controls the engagement and release of the dog teeth.

2. Description of Related Art

Japanese Patent Application Publication No. 2013-92211 (JP 2013-92211 A) discloses a meshing type engagement mechanism in which dog teeth are formed in two members facing each other. This meshing type engagement mechanism is provided with a double acting type hydraulic cylinder that allows an operating force to act on one of the two members. The hydraulic cylinder is configured such that the respective dog teeth mesh with each other when oil pressure is supplied to one of hydraulic chambers of the hydraulic cylinder and the meshing of the respective dog teeth is released when the oil pressure is supplied to the other hydraulic chamber. In addition, some of oil that is supplied to the hydraulic cylinder is ejected from tips of the dog teeth on one side so that a shock in a case where the tips of the dog teeth are in contact with each other is suppressed.

SUMMARY OF THE INVENTION

In the meshing type engagement mechanism that is disclosed in JP 2013-92211 A, tooth surfaces where the dog teeth are in contact with each other are subjected to a frictional force when a torque acts on the dog teeth. This frictional force acts in the direction that is opposite to a direction in which the dog teeth are separated from each other. Accordingly, it is difficult to release the meshing type engagement mechanism. Accordingly, the operating force usually acts to release the meshing of the respective dog teeth after the torque acting on the dog teeth is reduced. When the meshing type engagement mechanism is released in this manner, a control of the torque that acts on the dog teeth and a control for generating the operating force are coordinated with each other. Accordingly, a control for releasing the meshing type engagement mechanism becomes complicated, and a delay in the release might ensue.

The invention provides a control system for a meshing type engagement mechanism that is capable of simplifying a control for releasing a meshing type engagement mechanism.

A control system for a meshing type engagement mechanism according to an aspect of the invention includes the meshing type engagement mechanism and an electronic control unit. The meshing type engagement mechanism includes a first member, a second member, a fluid chamber, and a switching valve. The first member includes a plurality of first dog teeth protruding in an axial direction. The first dog teeth are placed at regular intervals in a circumferential direction of the first member. The second member includes a plurality of second dog teeth protruding in the axial direction. The second dog teeth are placed at regular intervals in a circumferential direction of the second member. The second dog teeth are configured to be inserted between the first dog teeth. The fluid chamber is configured to allow the second member to be moved to the first member side by an operating force attributable to supply of a fluid such that the first dog teeth and the second dog teeth mesh with each other. The switching valve is configured to switch between a communicating state where the fluid is supplied to the fluid chamber and a cut-off state where the supply of the fluid to the fluid chamber is stopped and the fluid chamber is filled with the fluid. A tooth surface of the first dog teeth and a tooth surface of the second dog teeth transmitting a torque in contact with each other are inclined surfaces such that a release force in a direction in which the first member and the second member are separated from each other in the axial direction is generated in response to the torque. The electronic control unit is configured to control the supply and stopping of the supply of the fluid to the fluid chamber by the switching valve. The electronic control unit is configured to allow the fluid chamber to be filled with the fluid by putting the switching valve into the cut-off state after the respective dog teeth mesh with each other by the second member reaching a predetermined position determined in advance in response to a fluid pressure of the fluid chamber such that the second member is pressed in the direction in which the second member is separated from the first member by the release force depending on the torque transmitted between the tooth surface of the first tooth and the tooth surface of the second tooth, the fluid pressure of the fluid chamber is increased, and an engagement state between the first member and the second member is maintained by the fluid pressure which is increased.

The control system according to the aspect described above may further include a pump discharging the fluid and a flow path allowing the fluid chamber and the pump to communicate with each other. The electronic control unit may be configured to control the pump after the flow path is cut off by the switching valve such that a discharge pressure of the pump is reduced.

The control system according to the aspect described above may further include detector for detecting a position of the second member in the axial direction.

In the control system according to the aspect described above, the fluid may be an incompressible fluid.

In the control system according to the aspect described above, the first member and the second member may be configured to rotate relative to each other when the first dog teeth and the second dog teeth do not mesh with each other. The first member and the second member may be configured to rotate integrally with each other when the first dog teeth and the second dog teeth mesh with each other.

In the control system according to the aspect described above, either one of the first member and the second member may be connected to a fixed part such that the other one of the first member and the second member stops rotating when the first dog teeth and the second dog teeth mesh with each other.

In the control system according to the aspect described above, the tooth surfaces of the first dog teeth and the second dog teeth transmitting the torque in contact with each other are the inclined surfaces that face each other, and the release force in the direction in which the first member and second member are separated from each other in the axial direction is generated in response to the torque in the direction in which the inclined surfaces are brought into contact with each other. Accordingly, the meshing type engagement mechanism can be released in a state where the torque is transmitted such that the inclined surfaces of the respective dog teeth are in contact with each other and the operating force by which the second member is pressed is reduced. In this case, a control of the torque that is input to the meshing type engagement mechanism and a control for reducing the operating force do not necessarily have to be coordinated with each other, and thus a control for releasing the meshing type engagement mechanism can be simplified.

In a case where the first member and the second member are engaged with each other, the fluid chamber is filled with the fluid after the respective dog teeth mesh with each other. When the torque is transmitted in this state, the second member is pressed in the direction in which the second member is separated from the first member, a compressive force acts on the fluid in the fluid chamber, and the fluid pressure increases. In other words, a reaction force against the release force is generated, and the state where the meshing type engagement mechanism is engaged is maintained. Accordingly, the pressure of the fluid that is supplied to the fluid chamber can be reduced so that the meshing type engagement mechanism is in the engagement state. Accordingly, the pressure of the fluid that is output from a fluid supply source such as the pump may be low, and thus a power loss can be reduced. In addition, since the fluid pressure of the fluid chamber increases in accordance with the torque as described above, a pressure that is required for the maintenance of the engagement state can be obtained even when a pressure-receiving area that is subjected to the fluid pressure is small. Accordingly, the pressure-receiving area of the fluid chamber can be reduced, and thus the volume of the fluid chamber is reduced. Accordingly, the length of time taken to complete the meshing of the respective dog teeth after the beginning of the supply of the fluid to the fluid chamber can be shortened. In addition, the amount of the fluid that is supplied for the respective dog teeth to mesh with each other can be reduced.

In a case where the fluid chamber is configured to be filled with the fluid with the flow path communicating with the fluid chamber and the pump cut off, the discharge pressure of the pump is reduced after the respective dog teeth mesh with each other and the flow path is cut off. Accordingly, the power loss from the pump can be reduced when the meshing type engagement mechanism is engaged.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 5:
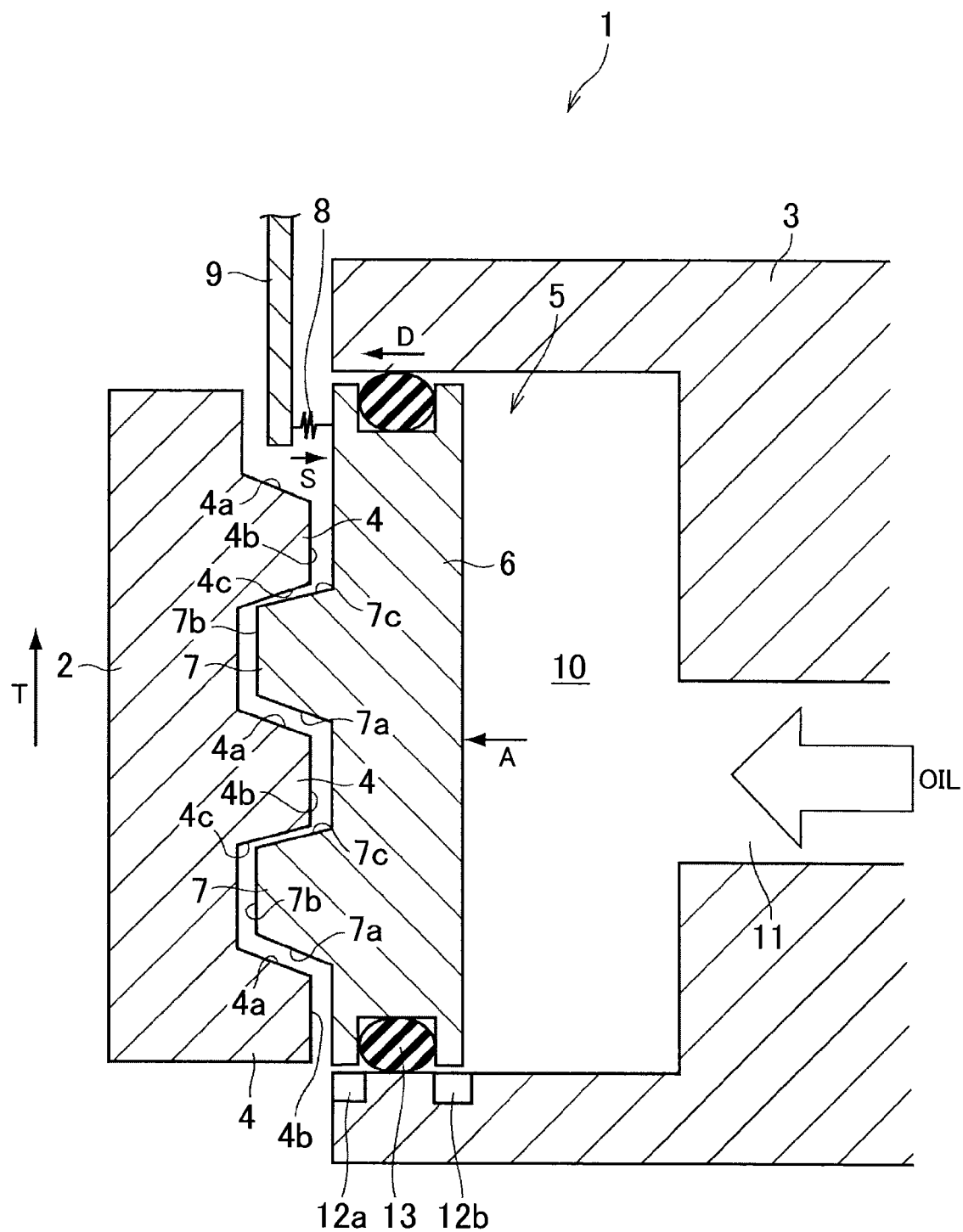
FIG. 5 is a schematic diagram for showing an example of a configuration of the meshing type engagement mechanism according to the invention.

A meshing type engagement mechanism according to the invention is provided with a first member where first dog teeth are formed and a second member where second dog teeth are formed. The meshing type engagement mechanism according to the invention is configured to allow the first dog teeth and the second dog teeth to mesh with each other when the second member is pressed and moved to the first member side. An example of this meshing type engagement mechanism is illustrated in FIG. 5. A meshing type engagement mechanism 1 that is illustrated in FIG. 5 is mounted in a vehicle. The meshing type engagement mechanism 1 is provided with an input member 2 and an output member 3. A torque is transmitted to the input member 2 from a power source such as an engine (not illustrated). The output member 3 is connected to a drive wheel (not illustrated) or the like. The input member 2 and the output member 3 are rotatably held in a casing (not illustrated) by a bearing or the like. The input member 2 and the output member 3 are placed to face each other at a predetermined interval in an axial direction. In the following description, the input member 2 inputs a torque T in the direction that is indicated by an arrow in the drawing.

The input member 2 corresponds to the "first member" according to an embodiment of the invention. The input member 2 has a plurality of first dog teeth 4 that protrude to the output member 3 side in the axial direction. The plurality of first dog teeth 4 are formed at predetermined intervals in a direction of rotation of the input member 2. Side surfaces 4a of the first dog teeth 4 that are in the direction of rotation of the input member 2 are at an angle to tip surfaces 4b of the first dog teeth 4, and the inclination angle is an obtuse angle. The meshing type engagement mechanism 1 is configured to generate a release force by the torque being input as described below. Accordingly, the above-described inclination angle can be determined based on a magnitude of the torque that is input when the meshing type engagement mechanism 1 is released.

A recessed portion 5 that is open to the input member 2 side is formed in the output member 3. A piston 6 is accommodated in the recessed portion 5. The piston 6 rotates integrally with the output member 3 and moves in the axial direction of the output member 3. Specifically, an inner surface of the recessed portion 5 and an outer surface of the piston 6 are in spline engagement with each other. The piston 6 corresponds to the "second member" according to the embodiment of the invention. The piston 6 has a plurality of second dog teeth 7 that are inserted between the first dog teeth 4. The plurality of second dog teeth 7 are formed at predetermined intervals in a direction of rotation of the output member 3. Side surfaces 7a of the second dog teeth 7 that face the side surfaces 4a of the first dog teeth 4 when the first dog teeth 4 and the second dog teeth 7 mesh with each other are formed at an angle. Specifically, the inclination angle of the side surfaces 7a of the second dog teeth 7 with respect to tip surfaces 7b of the second dog teeth 7 is an obtuse angle. Accordingly, the first dog teeth 4 and the second dog teeth 7 are in surface contact with each other when meshing with each other. In other words, the inclination angle of the side surfaces 4a of the first dog teeth 4 with respect to the tip surfaces 4b of the first dog teeth 4 is equal to the inclination angle of the side surfaces 7a of the second dog teeth 7 with respect to the tip surfaces 7b of the second dog teeth 7. In addition, in the example that is illustrated in FIG. 5, side surfaces 4c, 7c on the other sides of the respective dog teeth 4, 7 are formed at an angle as is the case with the side surfaces 4a, 7a. This is to allow the meshing type engagement mechanism 1 to be released in response to the torque even in a case where the direction of the torque that is input to the meshing type engagement mechanism 1 is reversed. The side surfaces 4a of the first dog teeth 4 correspond to "first tooth surfaces" in a case where the invention is carried out. The side surfaces 7a of the second dog teeth 7 that face the side surfaces 4a correspond to "second tooth surfaces" in a case where the invention is carried out.

A return spring 8 is also disposed in the meshing type engagement mechanism 1. The return spring 8 presses the piston 6 to a bottom surface side of the recessed portion 5. The return spring 8 is a compression spring that is disposed between a washer 9 which is fixed to a case (not illustrated) and the piston 6. As indicated by an arrow in FIG. 5, the return spring 8 is configured such that a spring force S acts at all times in the direction in which the piston 6 is separated from the input member 2.

Oil as an incompressible fluid is supplied to a space (hereinafter, referred to as a hydraulic chamber) 10 that is surrounded by a rear surface of the piston 6 and the inner surface of the recessed portion 5. In the example that is illustrated in FIG. 5, a first oil passage 11 is formed along the center of a rotational axis of the output member 3, and the hydraulic chamber 10 and a hydraulic pressure source (described later) are configured to communicate with each other via the first oil passage 11. Accordingly, when the oil is supplied to the hydraulic chamber 10, an operating force A acts on the piston 6 based on an oil pressure of the hydraulic chamber 10. When the operating force A surpasses the spring force S of the return spring 8, the piston 6 is moved to the input member 2 side. A stroke sensor 12 is disposed so that a position of the piston 6 is detected. In the example that is illustrated in FIG. 5, a first stroke sensor 12a and a second stroke sensor 12b are disposed. The first stroke sensor 12a detects a movement of the piston 6 from the bottom surface of the recessed portion 5 to a first predetermined position (described later). The second stroke sensor 12b detects a separation of the piston 6 from the input member 2 to a second predetermined position (described later). A seal member 13 is disposed between the outer surface of the piston 6 and the inner surface of the recessed portion 5 so that oil leakage from the hydraulic chamber 10 is suppressed.

Figure 6:
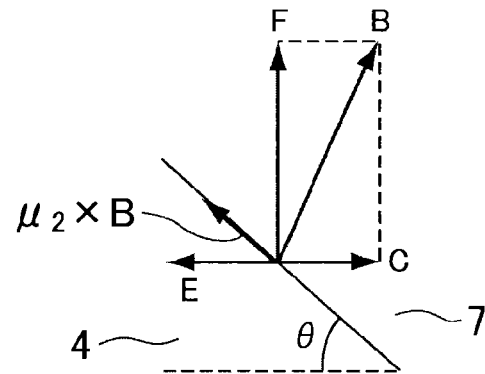
FIG. 6 is a drawing for showing a direction of a load that acts on side surfaces of second dog teeth when the meshing type engagement mechanism transmits a torque.

A load that acts on the piston 6 when the meshing type engagement mechanism 1 that is illustrated in FIG. 5 transmits the torque will be described below. A direction of the load that acts on the side surfaces 7a of the second dog teeth 7 when the meshing type engagement mechanism 1 transmits the torque is illustrated in FIG. 6. In a case where the meshing type engagement mechanism 1 transmits the torque, a load F in the direction of rotation of the output member 3 acts on the second dog teeth 7. The load F can be obtained from a distance between a central axis of rotation and a contact portion and the torque T input to the meshing type engagement mechanism 1. As described above, the side surfaces 7a of the second dog teeth 7 are formed at an angle, and thus a load (hereinafter, referred to as a vertical load) B in a vertical direction acts on the side surfaces 7a. This vertical load B can be obtained based on the load F and the inclination angle. Likewise, a load (hereinafter, referred to as a release force) C in the axial direction of the output member 3 acts on the side surfaces 7a. A direction of the release force C is the direction in which the piston 6 is separated from the input member 2. The vertical load B and the release force C can be obtained based on the following equations. In the following equations, "θ" represents the inclination angle of the side surfaces 7a of the second dog teeth 7 with respect to the rotational axis of the output member 3.

$$B = F/\cos\theta \tag{1}$$

$$C = B \times \sin\theta = F/\tan\theta \tag{2}$$

The torque is input to the piston 6 via the second dog teeth 7, and thus a frictional force D similarly acts on the contact portion of the piston 6 and the recessed portion 5. When the torque acts on the second dog teeth 7, contact surfaces of the first dog teeth 4 and the second dog teeth 7 are subjected to a frictional force, and a component force E of this frictional force acts against the release force described above. The frictional force D and the component force E of the frictional force to which the contact surfaces are subjected can be obtained based on the following equations. In the following equations, "$\mu_1$" represents a coefficient of friction of the contact portion of the piston 6 and the recessed portion 5, and "$\mu_2$" represents a coefficient of friction of the contact surfaces of the first dog teeth 4 and the second dog teeth 7.

$$D = \mu_1 \times F \tag{3}$$

$$E = \mu_2 \times B \times \cos\theta \tag{4}$$

As described above, the spring force S of the return spring 8 acts on the piston 6. In addition, the operating force A depending on the oil pressure of the hydraulic chamber 10 acts on the piston 6. The operating force A can be obtained by the product of a pressure-receiving area of the piston 6 and the oil pressure of the hydraulic chamber 10. Accordingly, the piston 6 is moved to the recessed portion 5 side when a resultant force of the release force C and the spring force S surpasses a resultant force of the frictional force D and the component force E of the frictional force to which the contact surfaces are subjected and the operating force A. In other words, the meshing type engagement mechanism 1 is released in a case where the following expression is satisfied.

$$C + S - (D + E + A) > 0 \tag{5}$$

As shown in the above-described equation (2), the release force C changes in proportion to the load F, and the load F changes in response to the torque T that is input to the meshing type engagement mechanism 1. Accordingly, the release force C is increased when the torque T that is input to the meshing type engagement mechanism 1 is increased. Accordingly, the meshing type engagement mechanism 1 can be released when the torque T that is input to the meshing type engagement mechanism 1 is increased and the oil pressure of the hydraulic chamber 10 is reduced.

The torque T that is input to the meshing type engagement mechanism 1 can be changed based on a control of an output torque of the power source (not illustrated), a transmission torque of another device that is disposed on a torque transmission path between the power source and the meshing type engagement mechanism 1, or the like. The oil pressure of the hydraulic chamber 10 can be changed when a discharge pressure of the hydraulic pressure source (described later) and a hydraulic control valve are controlled. The control of the torque T that is input to the meshing type engagement mechanism 1 and the control of the oil pressure of the hydraulic chamber 10 do not necessarily have to be coordinated with each other and can be individually performed. The meshing type engagement mechanism 1 is released when the above-described expression (5) is satisfied while the torque T that is input to the meshing type engagement mechanism 1 is changed and the oil pressure of the hydraulic chamber 10 is changed. Accordingly, a control for releasing the meshing type engagement mechanism 1 can be simplified.

In the meshing type engagement mechanism 1 that is configured as described above, the release force C acts even when the torque is transmitted. Accordingly, the oil pressure of the hydraulic chamber 10 needs to be maintained at a high level for an engagement state to be maintained. When a relatively high oil pressure is supplied to the hydraulic chamber 10, a power loss of the hydraulic pressure source might increase or the device might increase in size. Accordingly, a control system for the meshing type engagement mechanism according to the invention is configured to maintain the engagement state with a relatively low oil pressure supplied to the hydraulic chamber 10 and the oil pressure increased by the meshing type engagement mechanism 1 transmitting the torque.

Figure 7:
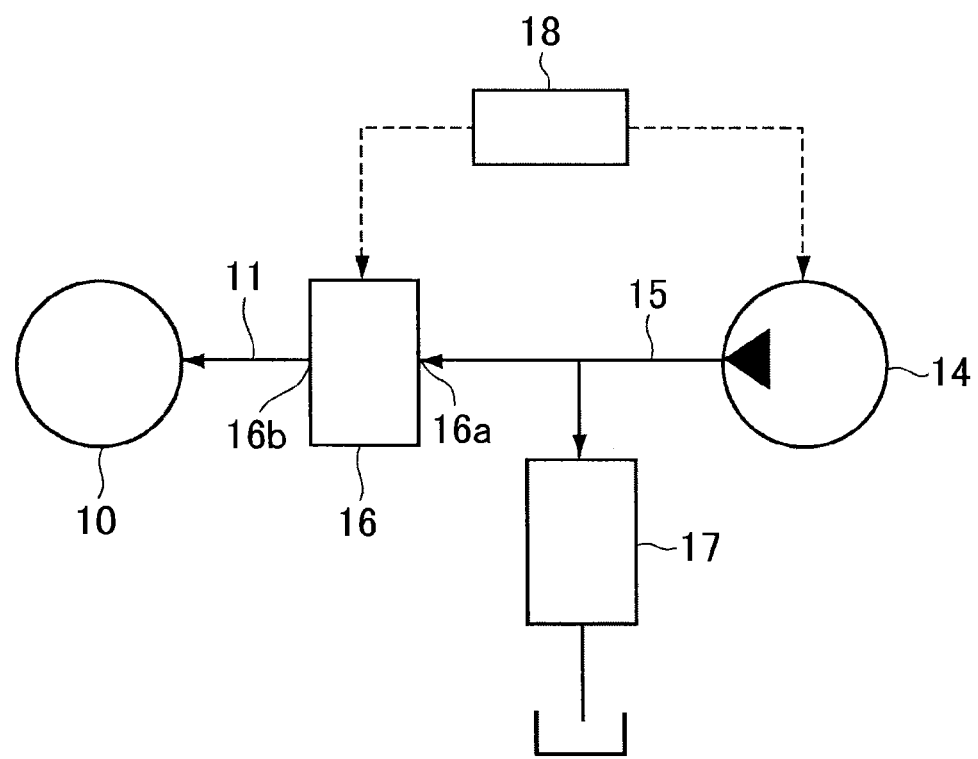
FIG. 7 is a hydraulic circuit diagram for showing an example of a configuration for supplying oil to the hydraulic chamber.

A hydraulic circuit for supplying the oil to the hydraulic chamber 10 will be described below. The hydraulic circuit is schematically illustrated in FIG. 7. The hydraulic circuit that is illustrated in FIG. 7 is provided with an electric oil pump (hereinafter, referred to as an EOP) 14 which generates an oil pressure in response to energizing electric power. The oil that is output from the EOP 14 flows through a second oil passage 15 and is supplied to an ON-OFF valve 16. The ON-OFF valve 16 is a normally closed-type electromagnetic valve that is configured to be opened when energized. The ON-OFF valve 16 is configured to be capable of sealing an input port 16a or an output port 16b in a state where the ON-OFF valve 16 is closed. Examples of the ON-OFF valve 16 include a poppet type valve that is configured to close the port 16a (16b) with a valve body abutting against the input port 16a or the output port 16b. The hydraulic chamber 10 communicates with the output port 16b of the ON-OFF valve 16. Accordingly, the oil is supplied from the EOP 14 to the hydraulic chamber 10 when the ON-OFF valve 16 is open. When the ON-OFF valve 16 is closed with the oil supplied to the hydraulic chamber 10, the hydraulic chamber 10 is filled with the oil. The ON-OFF valve 16 corresponds to "switching valve" according to the embodiment of the invention.

In addition, a pressure-reducing valve 17 is disposed to be opened and reduce an oil pressure of the second oil passage 15 in a case where the oil pressure of the second oil passage 15 is at least a predetermined value. The pressure-reducing valve 17 is opened and discharges the oil from the second oil passage 15 in a case where the oil pressure of the second oil passage 15 increases to at least a required oil pressure. The pressure-reducing valve 17 can be configured as any of various control valves that are known in the prior art. In a case where the EOP 14 is the hydraulic pressure source as illustrated in FIG. 7, the pressure of the oil that is supplied to the hydraulic chamber 10 is controlled by a value of a current with which the EOP 14 is energized being controlled. The hydraulic pressure source may be a mechanical oil pump that is driven when the torque is transmitted from another power source such as the engine. In this case, the hydraulic control valve may be disposed between the hydraulic pressure source and the ON-OFF valve 16 and the pressure of the oil supplied to the hydraulic chamber 10 may be controlled by the hydraulic control valve.

An electronic control unit (hereinafter, referred to as an ECU) 18 is disposed so that the EOP 14 and the ON-OFF valve 16 described above are controlled. The ECU 18 is configured to function as a controller when the following flowchart is executed. The ECU 18 is configured to have a microcomputer as its main component as is the case with those known in the prior art. The ECU 18 is configured to receive input signals from the respective stroke sensors 12a, 12b and another sensor (not illustrated) and output signals to the EOP 14 and the ON-OFF valve 16 or another device (not illustrated) by using the input signals and, a pre-stored map, a pre-stored arithmetic expression, or the like.

Figure 1:
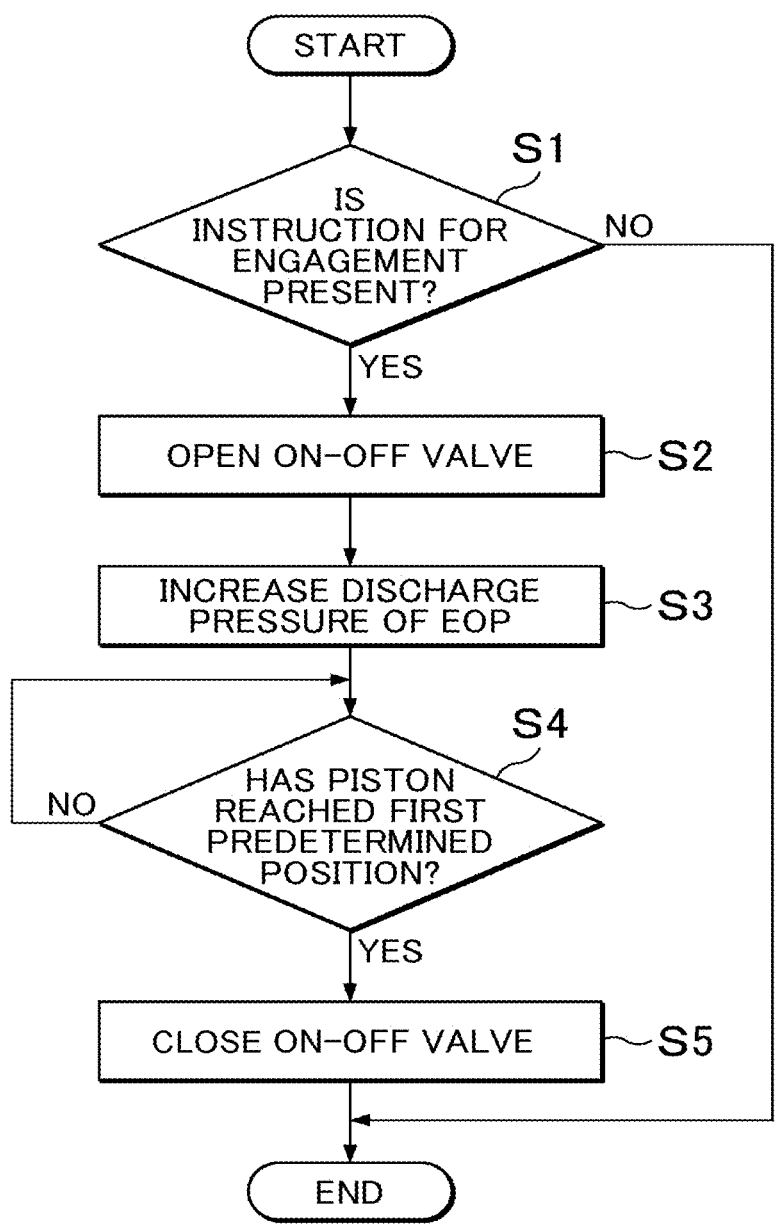
FIG. 1 is a flowchart for showing an example of a control for engagement of a meshing type engagement mechanism.

An example of a control for switching a state of the meshing type engagement mechanism 1 from a release state to the engagement state will be described below. This control is illustrated in FIG. 1. The control that is illustrated in FIG. 1 is repeatedly executed when the meshing type engagement mechanism 1 is in the release state. In a case where the ON-OFF valve 16 is a normally closed-type electromagnetic valve as described above, the ON-OFF valve 16 does not have to be opened when the meshing type engagement mechanism 1 is in the release state, and thus the ON-OFF valve 16 is in a closed state so that an electric power loss attributable to opening of the ON-OFF valve 16 is reduced. The discharge pressure of the EOP 14 is set to be low when the meshing type engagement mechanism 1 is in the release state so that the power loss of the EOP 14 or the like is reduced.

In the example that is illustrated in FIG. 1, the presence or absence of an instruction for the engagement of the meshing type engagement mechanism 1 is first determined (Step S1). In Step S1, the determination can be made by a signal from another control system such as a shift control system being received. In a case where a shift control mechanism is provided and the shift control mechanism is configured such that a predetermined gear is satisfied by the engagement of the meshing type engagement mechanism 1, for example, it can be determined whether or not the predetermined gear is set by a device controlling the shift control mechanism and the determination of Step S1 can be made based on a result of the determination. In the case of a negative determination in Step S1 with no instruction for the engagement of the meshing type engagement mechanism 1, this routine is temporarily terminated as it is.

In the case of a positive determination in Step S1 with the instruction for the engagement of the meshing type engagement mechanism 1, the ON-OFF valve 16 is opened (Step S2). In this case, it is preferable that a rotation speed of the input member 2 and a rotation speed of the output member 3 are substantially equal to each other as in the case of meshing type engagement mechanisms known in the prior art. A control for synchronizing the rotations speeds may be similar to a control that is known in the prior art, examples of which include controlling a rotation speed of the power source and a transmission torque capacity of a frictional engagement mechanism (not illustrated) which is connected to the meshing type engagement mechanism 1.

In addition, the discharge pressure of the EOP 14 is increased to a predetermined value (Step S3). This predetermined value is determined such that the operating force A which acts on the piston 6 based on the discharge pressure of the EOP 14 surpasses the spring force S of the return spring 8. In other words, this predetermined value is determined as a discharge pressure that allows the piston 6 to be moved to the input member 2 side. A procedure for executing Steps S2 and S3 is not particularly limited.

The oil pressure of the hydraulic chamber 10 is increased by the ON-OFF valve 16 being opened and the discharge pressure of the EOP 14 being increased as described above. As a result, the piston 6 is moved to the input member 2 side. Then, it is determined whether or not the piston 6 has reached the first predetermined position (Step S4). This determination of Step S4 can be made by the first stroke sensor 12*a* detecting the position of the piston 6. In addition, this meshing type engagement mechanism 1 is configured to raise the oil pressure of the hydraulic chamber 10 by transmitting the torque in a state where the hydraulic chamber 10 is filled with the oil as described below, and the piston 6 might be slightly pushed back to the recessed portion 5 side in this case. A predetermined amount is determined in Step S4 so that meshing amounts of the respective dog teeth 4, 7 are equal to or larger than a meshing amount determined in a design phase even in this case where the piston 6 is pushed back.

In the case of a negative determination in Step S4 with the piston 6 having yet to reach the first predetermined position, Step S4 is repeatedly executed until the piston 6 reaches the first predetermined position. In the case of a positive determination in Step S4 with the piston 6 at the first predetermined position, the ON-OFF valve 16 is closed (Step S5) and this routine is temporarily terminated.

Figure 2:
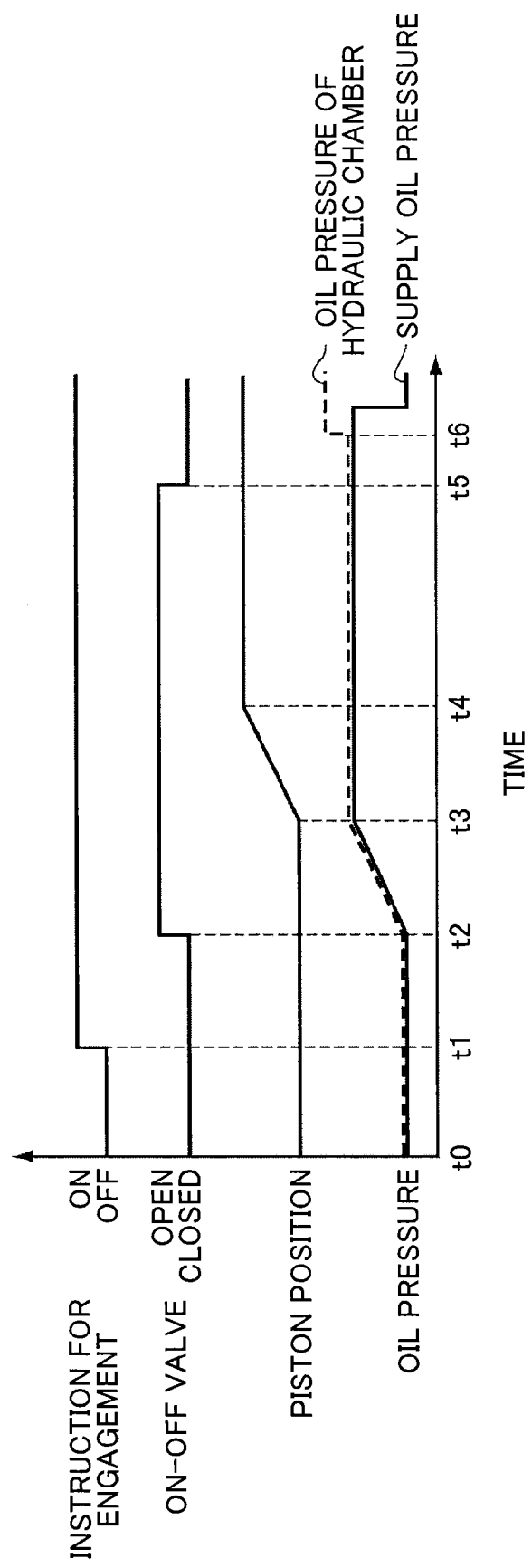
FIG. 2 is a time chart for showing changes in a position of a piston, an oil pressure of a hydraulic chamber, and a supply oil pressure during a course of the engagement of the meshing type engagement mechanism.

Changes in the position of the piston 6, the oil pressure of the hydraulic chamber 10, and a supply oil pressure (described later) pertaining to the case of the control that is illustrated in FIG. 1 are illustrated in FIG. 2. As illustrated in FIG. 2, no oil is supplied to the hydraulic chamber 10 at a time point (time point t0) when the meshing type engagement mechanism 1 is released, and thus the piston 6 is pressed by the return spring 8 and at the most distant position away from the input member 2. The position of the piston 6 in FIG. 2 corresponds to a distance from the bottom surface of the recessed portion 5, and FIG. 2 shows that the value increases as the piston 6 approaches the input member 2. In the case of a positive determination in Step S1 in FIG. 1 (time point t1), a flag for the engagement of the meshing type engagement mechanism 1 is turned ON. In the case of the presence of the instruction for the engagement of the meshing type engagement mechanism 1 as described above, the ON-OFF valve 16 is opened (time point t2). Almost simultaneously, the discharge pressure of the EOP 14 is increased and the oil pressures of the second oil passage 15 and the hydraulic chamber 10 begin to increase. In the following description, the oil pressure of the second oil passage 15 will be referred to as the supply oil pressure. The solid line in FIG. 2 represents the supply oil pressure, and the dashed line in FIG. 2 represents the oil pressure of the hydraulic chamber 10.

During the course of the increase in the oil pressure of the hydraulic chamber 10 described above or at a time point when the oil pressure reaches the predetermined value in Step S3 as a result of the increase, the operating force A that acts on the piston 6 surpasses the spring force S and the piston 6 begins to move to the input member 2 side (time point t3). When the piston 6 reaches a predetermined position thereafter (time point t4), a positive determination is made in Step S4 in FIG. 1, and then the ON-OFF valve 16 is closed (time point t5). When the ON-OFF valve 16 is closed as described above, the hydraulic chamber 10 is filled with the oil. Accordingly, when the torque is input to the meshing type engagement mechanism 1 after the ON-OFF valve 16 is closed, the piston 6 is pressed by the release force C and a compressive force acts on the oil in the hydraulic chamber 10. This compressive force increases in accordance with the input torque. As a result, the oil pressure of the hydraulic chamber 10 increases in accordance with the input torque (time point t6). In other words, a reaction force against the release force C is generated. Since the oil is an incompressible fluid as described above, the volume of the hydraulic chamber 10 rarely changes and the oil pressure of the hydraulic chamber 10 rapidly increases. In other words, the oil pressure of the hydraulic chamber 10 increases in stages as illustrated in FIG. 2. Since the piston 6 rarely moves as described above, no change in the position of the piston 6 is shown in FIG. 2. Since the reaction force is generated with the oil pressure of the hydraulic chamber 10 increased as described above, the engagement state is maintained even in a case where the torque is input to the meshing type engagement mechanism 1.

In the example that is illustrated in FIG. 2, the supply oil pressure is reduced so that the power loss of the hydraulic pressure source or the like is reduced after the ON-OFF valve 16 is closed. The supply oil pressure may be reduced after the oil pressure of the hydraulic chamber 10 is increased as illustrated in FIG. 2, or the supply oil pressure may be reduced before the oil pressure of the hydraulic chamber 10 is increased. In other words, a timing when the supply oil pressure is reduced may follow the closing of the ON-OFF valve 16.

In the meshing type engagement mechanism 1 that is configured as described above, the pressure of the oil supplied to the hydraulic chamber 10 is increased and the reaction force against the release force C is generated as a result of the torque transmission. Accordingly, the supply oil pressure can be a relatively low oil pressure that allows the movement of the piston 6, and thus the power loss of the EOP 14 can be reduced. In addition, since the oil pressure of the hydraulic chamber 10 increases in accordance with the torque as described above, a pressure that is required for the maintenance of the engagement state can be obtained even when the pressure-receiving area that is subjected to the oil pressure is small. Accordingly, the pressure-receiving area of the hydraulic chamber 10 can be reduced, and thus the volume of the hydraulic chamber 10 is reduced. Accordingly, the amount of the oil that is required when the meshing type engagement mechanism 1 is engaged can be reduced, and the power loss from the EOP 14 can be reduced. In addition, since the volume of the hydraulic chamber 10 can be reduced, the length of time taken to complete the meshing of the respective dog teeth 4, 7 after the beginning of the supply of the oil to the hydraulic chamber 10 can be shortened.

Figure 3:
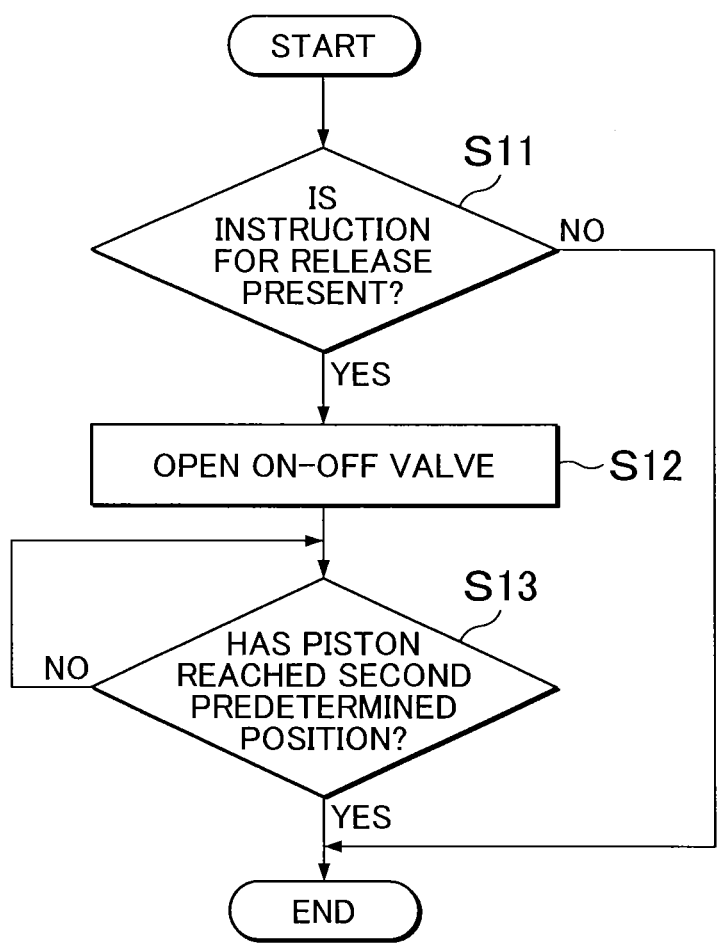
FIG. 3 is a flowchart for showing an example of a control for release of the meshing type engagement mechanism.

In a case where the meshing type engagement mechanism 1 is released as described above, the torque may be transmitted to the meshing type engagement mechanism 1 while the oil pressure of the hydraulic chamber 10 is reduced. An example of a control of the ON-OFF valve 16 during the release of the meshing type engagement mechanism 1 is illustrated in FIG. 3. The example that is illustrated in FIG. 3 is repeatedly executed in a case where the meshing type engagement mechanism 1 is engaged. The presence or absence of an instruction for the release of the meshing type engagement mechanism 1 is first determined (Step S11). In Step S11, the determination can be made by a signal from another control system such as the shift control system being received as in the case of Step S1 described above. In the case of a negative determination in Step S11 with no instruction for the release of the meshing type engagement mechanism 1, this routine is temporarily terminated as it is.

In the case of a positive determination in Step S11 with the instruction for the release of the meshing type engagement mechanism 1, the ON-OFF valve 16 is opened (Step S12). The oil in the hydraulic chamber 10 flows out toward the second oil passage 15 when the hydraulic chamber 10 and the second oil passage 15 communicate with each other by the ON-OFF valve 16 being opened. This is because the oil pressure of the hydraulic chamber 10 is a relatively high oil pressure that is increased by the piston 6 being pressed and the oil pressure of the second oil passage 15 is set as a relatively low oil pressure so that the power loss of the EOP 14 is reduced as described above. When the oil flows through the second oil passage 15 as described above, it is preferable that the pressure-reducing valve 17 is open and the oil pressure of the second oil passage 15 is maintained constant. This is because the oil becomes unlikely to flow out from the hydraulic chamber 10 and the release of the meshing type engagement mechanism 1 might slow down when the outflow of the oil from the hydraulic chamber 10 toward the second oil passage 15 causes the oil pressure of the second oil passage 15 to increase.

The opening of the ON-OFF valve 16 and the reduction in the oil pressure of the hydraulic chamber 10 described above cause the piston 6 to begin to be moved to the recessed portion 5 side by the release force C acting on the second dog teeth 7 and the spring force S of the return spring 8. The meshing type engagement mechanism 1 is released when the piston 6 is moved as described above to cause the respective dog teeth 4, 7 not to mesh with each other. Accordingly, it is determined (Step S13) whether or not the piston 6 has reached the second predetermined position from the input member 2 side in Step S12. The position of the piston 6 in Step S13 can be detected by the second stroke sensor 12b. The second predetermined position in Step S13 is a position where the respective dog teeth 4, 7 begin not to mesh with each other and is a value that is determined from structures of the respective dog teeth 4, 7. In the case of a negative determination in Step S13 with the piston 6 having yet to reach the predetermined position, Step S13 is repeatedly executed until the piston 6 reaches the second predetermined position. In the case of a positive determination in Step S13 with the piston 6 at the second predetermined position, this routine is temporarily terminated. In a case where the meshing type engagement mechanism 1 is released, the ON-OFF valve 16 may remain open or closed. Accordingly, in the case of the above-described normally closed-type electromagnetic valve, it is preferable that the ON-OFF valve 16 remains closed so that the electric power loss is reduced. In addition, since oil pressure generation by the EOP 14 is not required, the supply oil pressure is maintained at a relatively low oil pressure reduced by the pressure-reducing valve 17.

Figure 4:
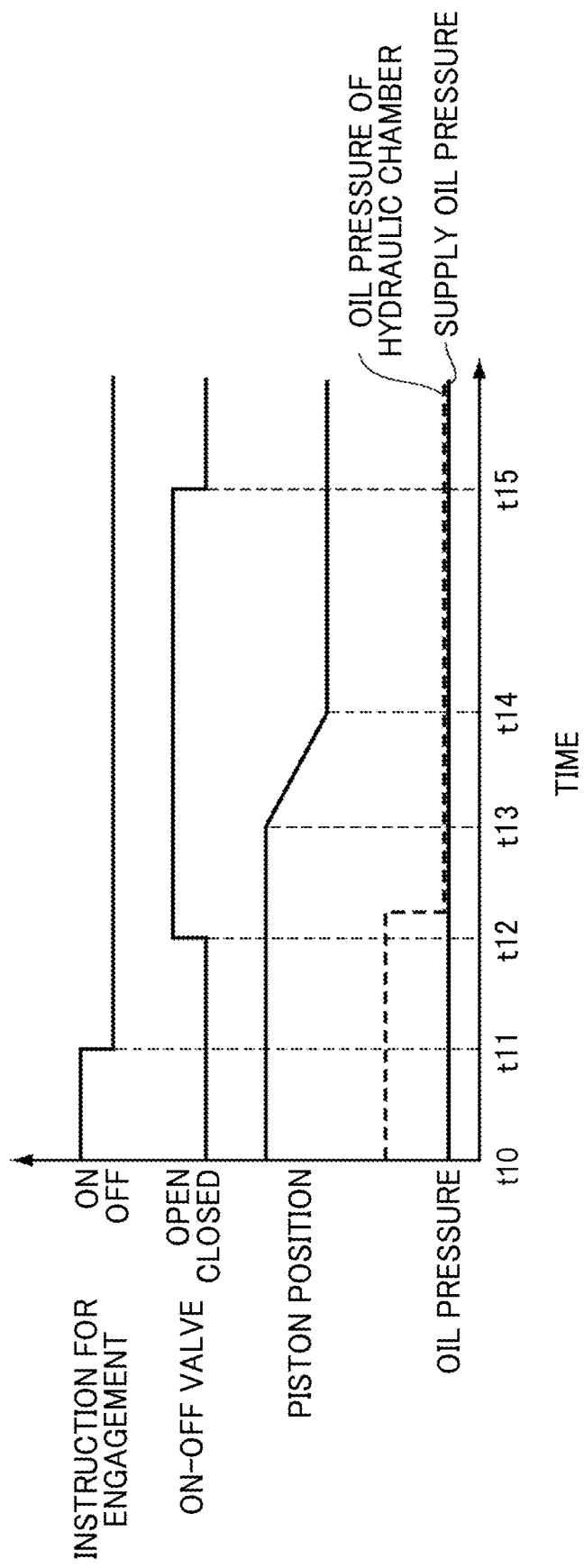
FIG. 4 is a time chart for showing changes in the position of the piston, the oil pressure of the hydraulic chamber, and the supply oil pressure during a course of the release of the meshing type engagement mechanism.

Changes in the position of the piston 6, the oil pressure of the hydraulic chamber 10, and the supply oil pressure pertaining to a case where the control that is illustrated in FIG. 3 is carried out are illustrated in FIG. 4. The solid line in FIG. 4 represents the supply oil pressure, and the dashed line in FIG. 4 represents the oil pressure of the hydraulic chamber 10. In the example that is illustrated in FIG. 4, the oil pressure of the hydraulic chamber 10 is first maintained at a relatively high oil pressure (time point t10). This is because the torque is input to the meshing type engagement mechanism 1 in a state where the hydraulic chamber 10 is filled with the oil as described above. The supply oil pressure is maintained at the oil pressure that is reduced at time point t6 which is illustrated in FIG. 2. This oil pressure is an oil pressure that is lower than the oil pressure which is set when the piston 6 is moved to the input member 2 side. In the case of the presence of the instruction for the release of the meshing type engagement mechanism 1 (time point t11), the ON-OFF valve 16 is opened thereafter (time point t12). The oil pressure of the hydraulic chamber 10 is reduced by the ON-OFF valve 16 being opened. In this case, the oil pressure of the hydraulic chamber 10 can be promptly reduced by the pressure-reducing valve 17 being controlled so that the supply oil pressure does not change. Then, the piston 6 begins to be moved (time point t13) by the oil pressure of the hydraulic chamber 10 being reduced. When the piston 6 reaches the second predetermined position (time point t14), the meshing type engagement mechanism 1 is released. In the example that is illustrated in FIG. 4, the ON-OFF valve 16 is put into a closed state (time point t15) after the piston 6 reaches the second predetermined position.

In a case where the meshing type engagement mechanism 1 is released as described above, the ON-OFF valve 16 may be opened in a state where the torque continues to be input to the meshing type engagement mechanism 1. Accordingly, a control for releasing the meshing type engagement mechanism 1 as described above can be simplified.

The meshing type engagement mechanism 1 according to the invention is not limited to the configuration that generates the operating force A by allowing the oil pressure to act directly on the piston 6. For example, the meshing type engagement mechanism 1 may be configured such that a hydraulic actuator is connected to the piston 6 and the piston 6 is pressed to the input member 2 side by the operating force A of the hydraulic actuator. In the case of this configuration, the hydraulic circuit may be configured such that a hydraulic chamber of the hydraulic actuator can be filled with the oil.

The fluid that is supplied to the hydraulic chamber 10 may be a compressible fluid instead of the incompressible fluid. In a case where the compressible fluid is supplied to the hydraulic chamber 10, the input of the torque to the meshing type engagement mechanism 1 in a state where the hydraulic chamber 10 is filled with fluid causes the fluid in the hydraulic chamber 10 to be compressed and the piston 6 to be significantly moved to the recessed portion 5 side. Accordingly, the amount by which the piston 6 is pushed back to the recessed portion 5 side may be obtained from the pressure of the fluid that is supplied to the hydraulic chamber 10 for the engagement of the respective dog teeth 4, 7 and the torque T that is input to the meshing type engagement mechanism 1 and a position that is obtained by adding the amount of the movement obtained as described above to the meshing amount determined in the design phase may be regarded as the first predetermined position described above. This control allows the engagement state to be maintained even in a case where the torque is input to the meshing type engagement mechanism 1. In addition, the ON-OFF valve 16 may be replaced with a switching valve that is configured to allow the second oil passage 15 and the hydraulic chamber 10 to communicate with each other when opening and closing the output port 16b to seal the hydraulic chamber 10 and discharge the oil from the second oil passage 15 by allowing the second oil passage 15 and a drain port (not illustrated) to communicate with each other when closed.

What is claimed is:

1. A control system for a meshing type engagement mechanism, comprising:
    the meshing type engagement mechanism including a first member, a second member, a fluid chamber, and a switching valve, the first member including a plurality of first dog teeth protruding in an axial direction, the first dog teeth being placed at regular intervals in a circumferential direction of the first member, the second member including a plurality of second dog teeth protruding in the axial direction, the second dog teeth being placed at regular intervals in a circumferential direction of the second member, the second dog teeth being configured to be inserted between the first dog teeth, the fluid chamber being configured to allow the second member to be moved to the first member side by an operating force attributable to supply of a fluid such that the first dog teeth and the second dog teeth mesh with each other, the switching valve being configured to switch between a communicating state where the fluid is supplied to the fluid chamber and a cut-off state where the supply of the fluid to the fluid chamber is stopped and the fluid chamber is filled with the fluid, and a tooth surface of the first dog teeth and a tooth surface of the second dog teeth transmitting a torque in contact with each other being inclined surfaces such that a release force in a direction in which the first member and the second member are separated from each other in the axial direction is generated in response to the torque; and an electronic control unit configured to control the supply and stopping of the supply of the fluid to the fluid chamber by the switching valve, the electronic control unit being configured to allow the fluid chamber to be filled with the fluid by putting the switching valve into the cut-off state after the respective dog teeth mesh with each other by the second member reaching a predetermined position determined in advance in response to a fluid pressure of the fluid chamber such that the second member is pressed in the direction in which the second member is separated from the first member by the release force depending on the torque transmitted between the tooth surface of the first tooth and the tooth surface of the second tooth, the fluid pressure of the fluid chamber is increased, and an engagement state between the first member and the second member is maintained by the fluid pressure which is increased.

2. The control system according to claim 1, further comprising:
a pump discharging the fluid; and
a flow path allowing the fluid chamber and the pump to communicate with each other,
wherein the electronic control unit is configured to control the pump after the flow path is cut off by the switching valve such that a discharge pressure of the pump is reduced.

3. The control system according to claim 1, further comprising:
a detector detecting a position of the second member in the axial direction.

4. The control system according to claim 1, wherein the fluid is an incompressible fluid.

5. The control system according to claim 1, wherein the first member and the second member are configured to rotate relative to each other when the first dog teeth and the second dog teeth do not mesh with each other, the first member and the second member being configured to rotate integrally with each other when the first dog teeth and the second dog teeth mesh with each other.

6. The control system according to claim 1, wherein either one of the first member and the second member is connected to a fixed part such that the other one of the first member and the second member stops rotating when the first dog teeth and the second dog teeth mesh with each other.

* * * * *